(12) United States Patent
Morita et al.

(10) Patent No.: US 7,556,061 B2
(45) Date of Patent: Jul. 7, 2009

(54) MIXING FAUCET ASSEMBLY

(75) Inventors: Kazunori Morita, Fukuoka (JP); Tsuyoshi Murata, Fukuoka (JP)

(73) Assignee: Toto Ltd. (JP)

( * ) Notice: Subject to any disclaimer, the term of this patent is extended or adjusted under 35 U.S.C. 154(b) by 254 days.

(21) Appl. No.: 11/564,106

(22) Filed: Nov. 28, 2006

(65) Prior Publication Data
US 2007/0119507 A1 May 31, 2007

(30) Foreign Application Priority Data
Nov. 29, 2005 (JP) .............................. 2005-344252

(51) Int. Cl.
*F16K 11/06* (2006.01)
(52) U.S. Cl. .................... 137/625.17; 4/677
(58) Field of Classification Search ............ 137/625.17, 137/625.4, 801; 4/677
See application file for complete search history.

(56) References Cited

U.S. PATENT DOCUMENTS

| | | | |
|---|---|---|---|
| 4,942,902 A | | 7/1990 | Knapp |
| 5,363,880 A | * | 11/1994 | Hsieh ..................... 137/625.17 |
| 5,494,077 A | * | 2/1996 | Enoki et al. ............ 137/625.17 |
| 5,887,852 A | * | 3/1999 | Delaisement ............... 251/285 |
| 6,170,523 B1 | * | 1/2001 | Chang ..................... 137/625.17 |
| 6,390,128 B1 | * | 5/2002 | Tung ....................... 137/625.17 |

FOREIGN PATENT DOCUMENTS

| | | |
|---|---|---|
| JP | 08-042724 | 2/1996 |
| WO | 2005068884 A | 7/2005 |

* cited by examiner

*Primary Examiner*—John Fox
(74) *Attorney, Agent, or Firm*—Brooks Kushman P.C.

(57) ABSTRACT

Disclosed is a mixing faucet assembly (1), which comprises: a mixing valve unit (8) having at least two valve inlet ports (32b), a operating rod (24) and a valve outlet port (28); a faucet body (2) having at least two water-feed passages (2b), and a valve unit-receiving recess (2a) containing the mixing valve unit in such a manner as to receive mixture of hot and cold water discharged from the valve outlet port; a spout portion (6) formed to extend from an upper end of the faucet body in an approximately horizontal direction and have a spout-portion water passage (6a) for receiving the mixture discharged from the valve unit-receiving recess, and a spout port (4); and a load-supporting portion (2d) formed to protrude inwardly toward the inside of the valve unit-receiving recess in such a manner as to come into contact with an upper region of a lateral surface of the mixing valve unit on at least one side corresponding to a location of the spout portion to support the mixing valve unit. The present invention allows the mixing faucet assembly to be reduced in overall height dimension.

4 Claims, 11 Drawing Sheets

MIXING FAUCET ASSEMBLY

BACKGROUND OF THE INVENTION

1. Field of the Invention

The present invention relates to a mixing faucet assembly, and more particularly to a mixing faucet assembly for changing a mixing ratio between hot and cold water supplied from respective hot-water and cold-water supply pipes, and adjusting a discharge flow rate, using a single operating lever.

2. Description of the Related Art

Japanese Patent Laid-Open Publication No. 8-42724 (Patent Publication 1) discloses a single-lever faucet. FIG. 11 is a partially broken away side view showing such a single-lever faucet which is a conventional mixing faucet assembly. As shown in FIG. 11, the conventional single-lever faucet 200 comprises a faucet body 202 which extends vertically, a spout portion 206 which extends obliquely upwardly from an intermediate portion of the faucet body 202 and includes a spout port 204, a mixing valve 208 housed in the faucet body 202, and an operating lever 210 for operating the mixing valve 208. In the single-lever faucet 200, the operating lever 210 is adapted to be rotated in an upward/downward direction about an axis oriented in a horizontal direction so as to adjust a discharge flow rate, i.e., a flow volume to be spouted, and to be rotated in a rightward/leftward direction about an axis oriented in a vertical direction so as to adjust a mixing ratio between hot and cold water.

In the conventional single-lever faucet 200, hot and cold water supplied from below the faucet body 202 are received in the mixing valve 208 positioned at an upper end of the faucet body 202, and a mixture of hot and cold water mixed in the mixing valve 208 is discharged from a valve outlet port (not shown) formed in a bottom surface of the mixing valve 208. Then, the mixture is passed through the spout portion 206 extending obliquely upwardly from below relative to the mixing valve 208, and spouted from the spout port 204.

[Patent Publication 1] Japanese Patent Laid-Open Publication No. 8-42724

SUMMARY OF THE INVENTION

The conventional single-lever faucet 200 disclosed in the Japanese Patent Laid-Open Publication No. 8-42724 has a relatively large overall height dimension, which leads to a problem that the single-lever faucet 200 installed in a wash stand hinders the view to a mirror located on the back thereof. Generally, in a single-lever faucet, it is necessary for a spout portion 206 with a spout port 204 to be located at a given height required for carrying out its original function. Thus, there is the need for minimizing a height dimension of a component which protrudes above relative to a proximal end of the spout portion 206, such as a part of a faucet body 202 and an operating lever 210.

In this regard, the above conventional single-lever faucet 200 has a problem about difficulty in reducing an overall height dimension thereof due to the structural requirement that the mixing valve 208 is positioned above relative to an proximal end of the spout portion 206. Moreover, the conventional single-lever faucet 200 is designed to discharge a mixture of hot and cold water from the bottom surface of the mixing valve 208, and thereby it is necessary to lead this mixture to an upper portion of the spout portion 206 located above relative to the mixing valve 208. For this purpose, the single-lever faucet 200 is required to have a water passage for leading the mixture from below the mixing valve 208 to the upper portion of the spout portion 206, which causes a problem about increase in size of the faucet body 202. Further, the design for reducing the size of the faucet body 202 involves a problem about difficulty in securely supporting the mixing valve 208 receiving an operating force to be applied to the operating lever 210, which is likely to result in defective sealing between the mixing valve 208 and the faucet body 202.

It is therefore an object of the object of the present invention to provide a compact mixing faucet assembly having a reduced overall height dimension.

It is another object of the present invention to provide a mixing faucet assembly capable of securely supporting a mixing valve by a faucet body, yet be compact in size.

In order to achieve the above objects, the present invention provides a mixing faucet assembly for changing a mixing ratio between hot and cold water supplied thereto and adjusting a discharge flow rate, using a single operating lever, comprising: a mixing valve unit having valve inlet ports for receiving the supplied hot and cold water respectively therethrough, a operating rod for adjusting a mixing ratio between the received hot and cold water and a discharge flow rate, and a valve outlet port for discharging a mixture of hot and cold water therethrough; a faucet body having water-feed passages for leading the supplied hot and cold water, respectively, to the valve inlet ports and having a valve unit-receiving recess formed on an upper portion of said faucet body, the valve unit-receiving recess housing the mixing valve unit to receive the mixture discharged from the valve outlet port; a spout portion extending from an upper end of the faucet body in an approximately horizontal direction and having a spout-portion water passage for receiving the mixture discharged from the valve unit-receiving recess and a spout port for spouting the mixture received in the spout-portion water passage; and a load-supporting portion inwardly protruding toward the inside of the valve unit-receiving recess and contacting with an upper region of a lateral surface of the mixing valve unit on at least one side corresponding to a location of the spout portion, to support the mixing valve unit.

In the above mixing faucet assembly of the present invention, the received hot and cold water from the respective valve inlet ports for receiving the supplied hot and cold water are mixed together within the mixing valve unit, and discharged from the valve outlet port. The discharged mixture of hot and cold water from the valve outlet port is received in the valve unit-receiving recess. Then, the mixture is led to the spout-portion water passage of the spout portion after being passed through the valve unit-receiving recess, and pouted from the spout port. An operating force transferred from the operating lever to the mixing valve unit is supported by the load-supporting portion in contact with the upper region of the lateral surface of the mixing valve unit.

Thus, the discharged mixture from the valve outlet port can be passed through between a wall surface of the valve unit-receiving recess and the mixing valve unit and led to the spout-portion water passage, to allow the faucet body to be reduced in size. In addition, an operating force applied to the operating lever can be supported by the load-supporting portion to prevent the mixing valve unit from being displaced within the valve unit-receiving recess. This makes it possible to prevent the occurrence of defective sealing between the mixing valve unit and the faucet body.

Preferably, in the mixing faucet assembly of the present invention, the valve outlet port is formed in the lateral surface of the mixing valve unit, wherein the mixture discharged from the valve outlet port flows upwardly around the lateral surface of the mixing valve unit and then flows into the spout portion.

Thus, the mixture of hot and cold water can be discharged from the valve outlet port formed in the lateral surface of the mixing valve unit and received in the spout portion located on an upper side of the mixing valve unit, to allow the faucet body to be further reduced in size. The load-supporting portion supporting an operating force applied to the operating lever allows the valve outlet port to be formed in the lateral surface of the mixing valve unit.

Preferably, in the mixing faucet assembly of the present invention, the mixing valve unit includes a rotational-movement restricting portion adapted to exert an approximately horizontal force on the operating rod so as to restrict a rotational movement of the operating rod, and a force-transferring surface portion extending in approximately horizontal direction to transfer a force imposed on the rotational-movement restricting portion, and the load-supporting portion is disposed on a plane including the force-transferring surface portion or in a vicinity of the force-transferring surface portion.

In this mixing faucet assembly, an operating force applied to the operating rod of the mixing valve unit is transferred to the force-transferring surface portion through the rotational-movement restricting portion of the mixing valve unit. Then, the operating force transferred to the force-transferring surface portion is supported by the load-supporting portion disposed on a plane including the force-transferring surface portion or in a vicinity of the force-transferring surface portion.

Thus, the operating force transferred to the force-transferring surface portion can be supported by the load-supporting portion disposed on a plane including the force-transferring surface portion or in a vicinity of the force-transferring surface portion, to prevent the mixing valve unit from being deformed due to the operating force. This makes it possible to prevent the occurrence of defective sealing between the mixing valve unit and the faucet body.

Preferably, in the mixing faucet assembly of the present invention, the mixing valve unit has a lateral surface formed in a cylindrical shape, and the valve unit-receiving recess has a first surface located on the side communicating with the spout portion, and second and third surfaces extending from respective opposed edges of the first surface to form a generally angular-C shape in cooperation with the first surface, wherein the mixture discharged from the valve outlet port flows into the spout-portion water passage via generally triangular-shaped passages defined between two corners of the angular-C shaped surface and the cylindrical-shape lateral surface of the mixing valve unit.

Thus, the mixture can be led to the spout-portion water passage via the triangular-shaped passages defined between the corners of the angular-C shaped surface of the valve unit-receiving recess and the cylindrical-shape lateral surface of the mixing valve unit, to allow the faucet body to be reduced in size.

As above, the present invention can provide a compact mixing faucet assembly having a reduced overall height dimension.

Further, the mixing faucet assembly of the present invention can securely support a mixing valve by a faucet body, yet be compact in size.

DETAILED DESCRIPTION OF THE PREFERRED EMBODIMENTS OF THE INVENTION

With reference to the accompanying drawings, a mixing faucet assembly according to an embodiment of the present invention will now be described. Firstly, with reference to FIGS. 1 to 9, a mixing faucet assembly according to a first embodiment of the present invention will be described.

Figure 1:
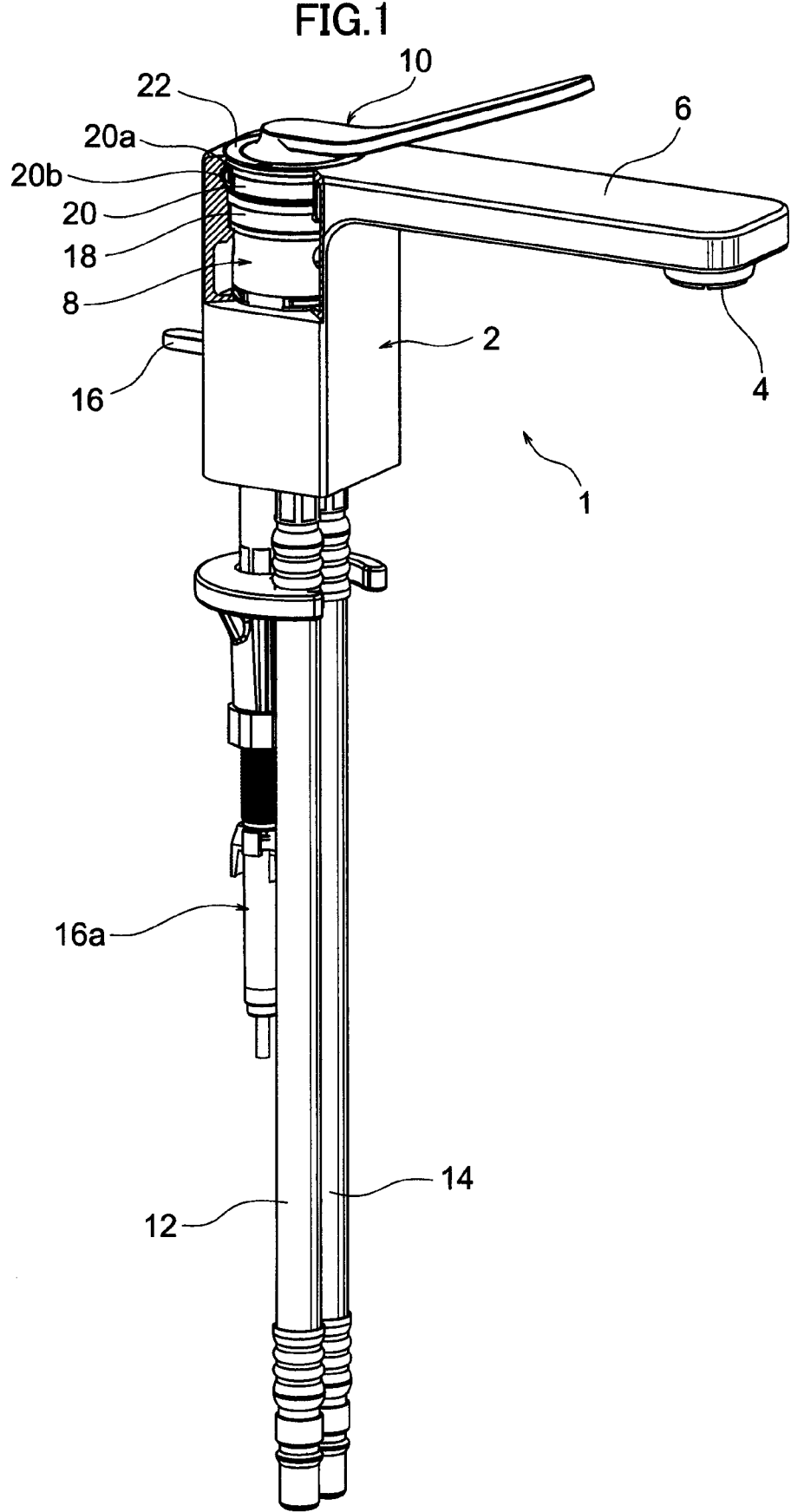
FIG. 1 is a partially broken away side view generally showing a mixing faucet assembly according to a first embodiment of the present invention.
Figure 2:
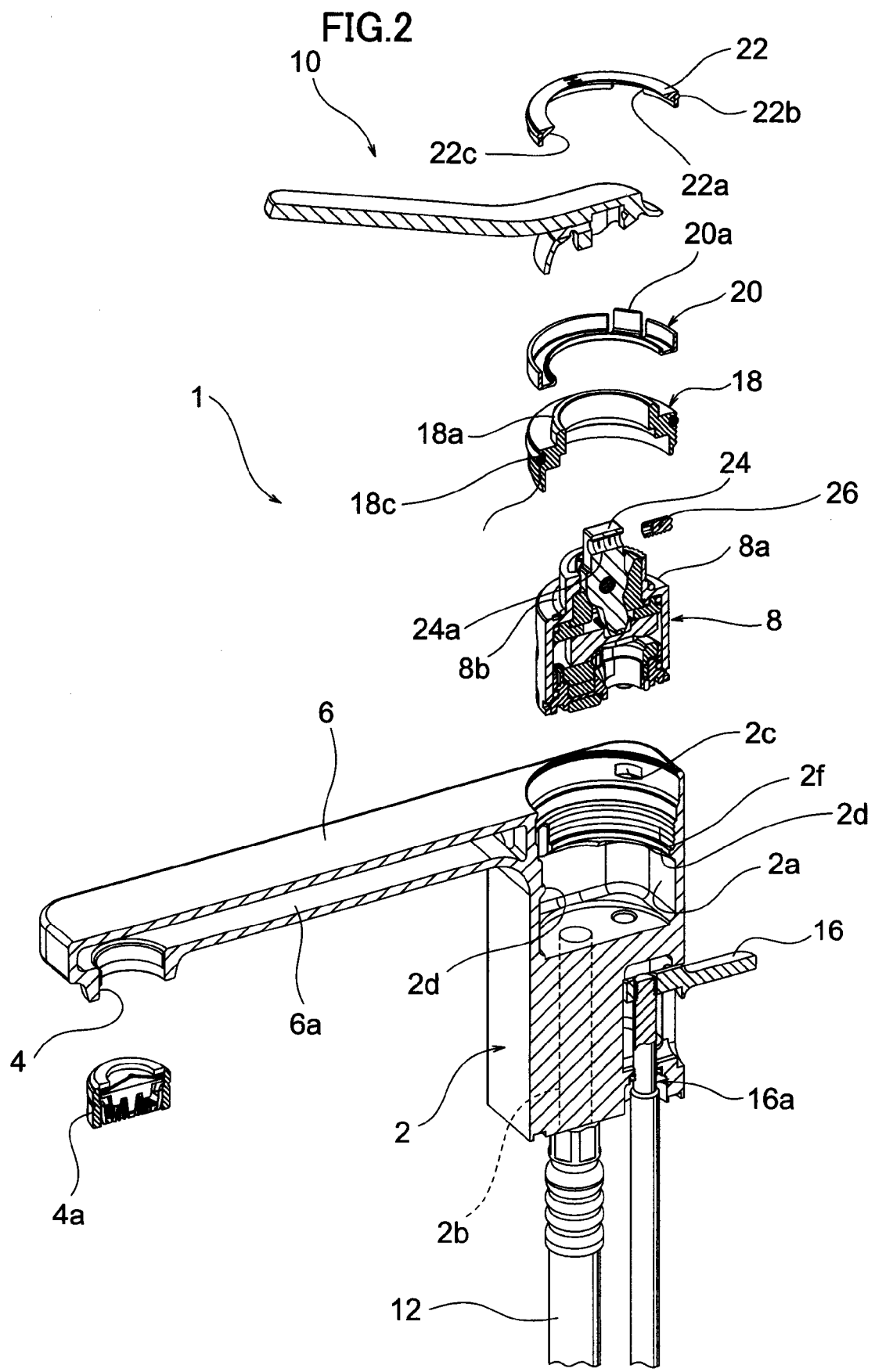
FIG. 2 is an exploded sectional perspective view showing the mixing faucet assembly according to the first embodiment.
Figure 3:
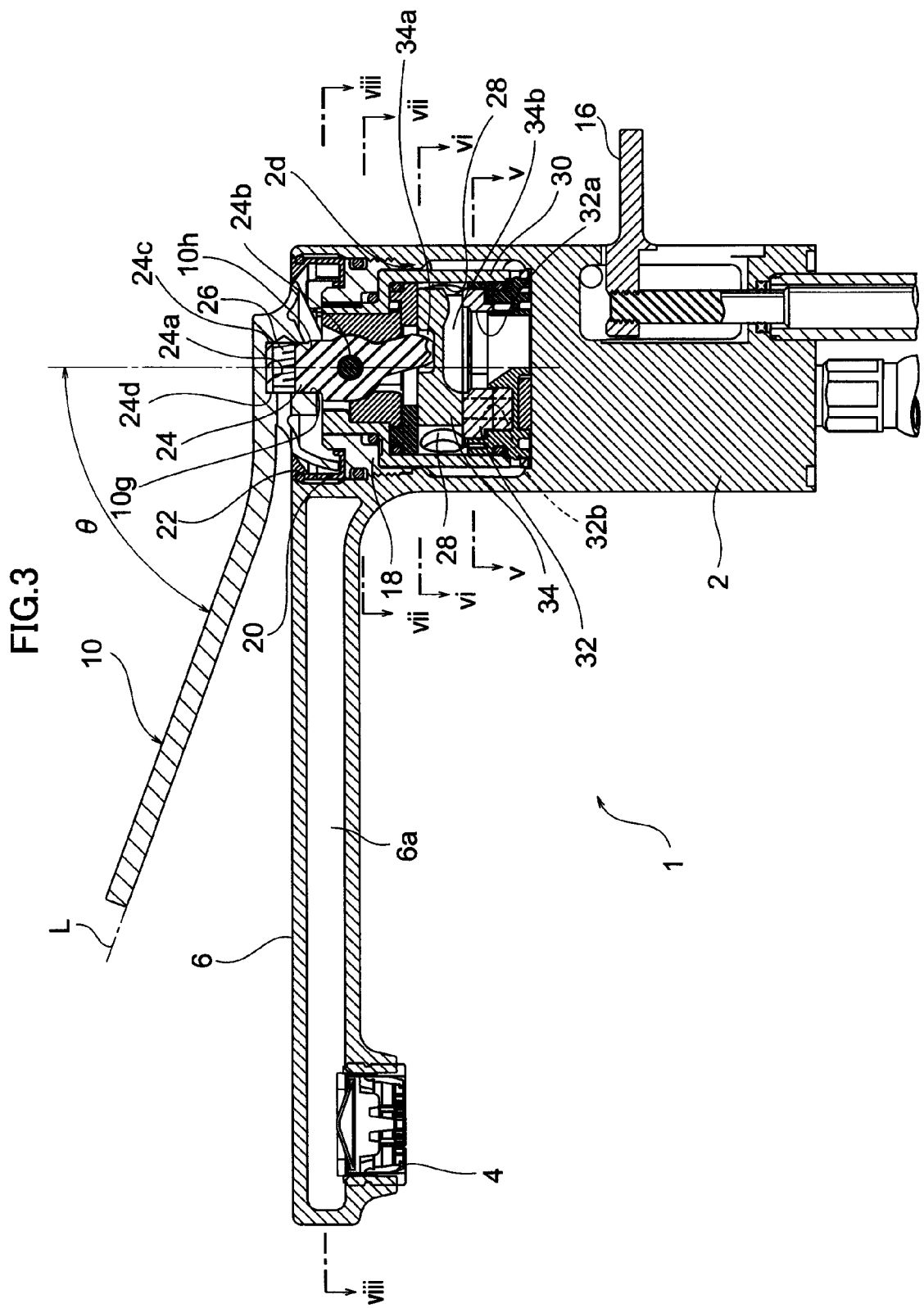
FIG. 3 is a sectional side view showing the mixing faucet assembly according to the first embodiment, in a water shutoff state.
Figure 4:
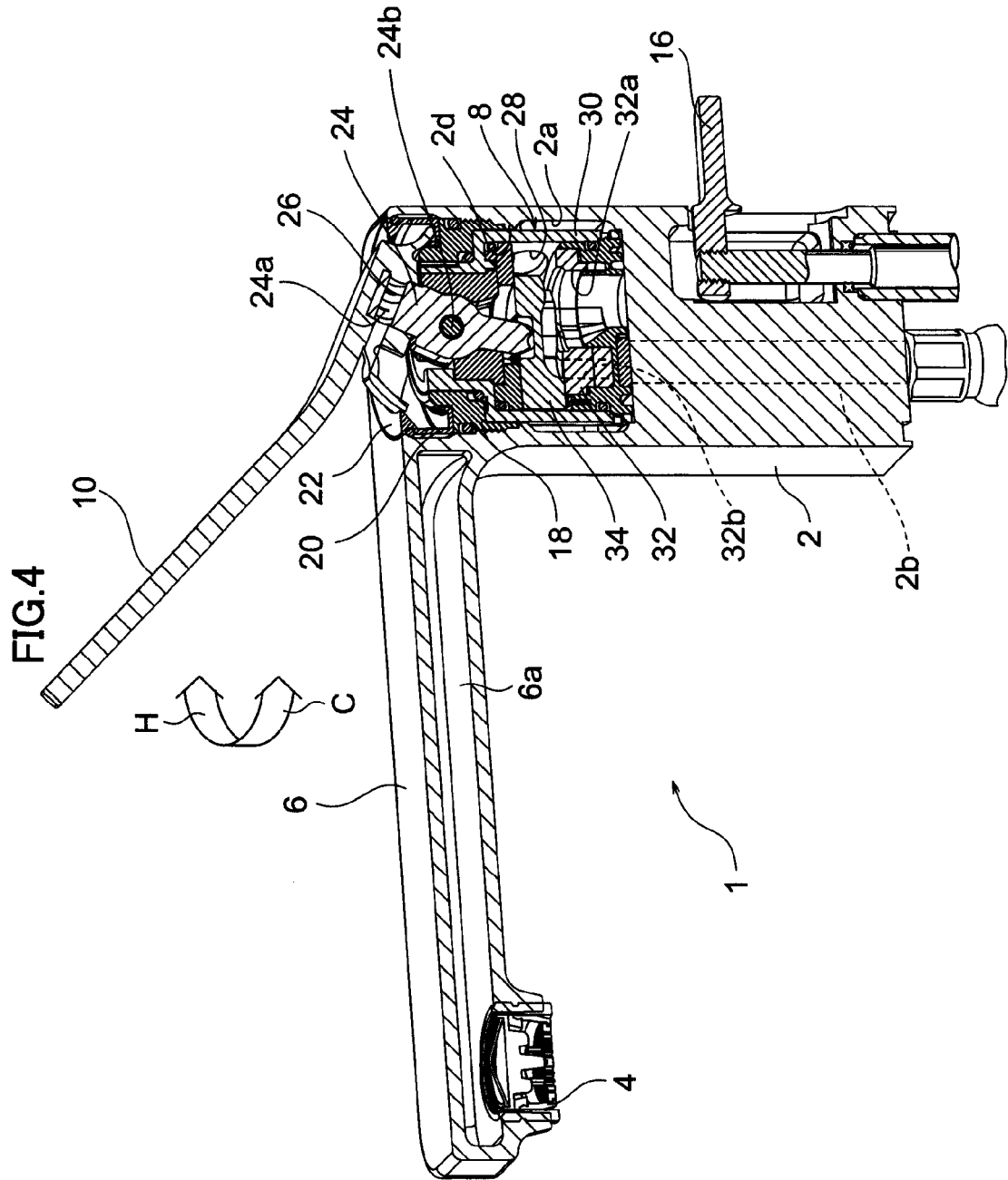
FIG. 4 is a sectional perspective view showing the mixing faucet assembly according to the first embodiment, in a water discharge state.
Figure 8:
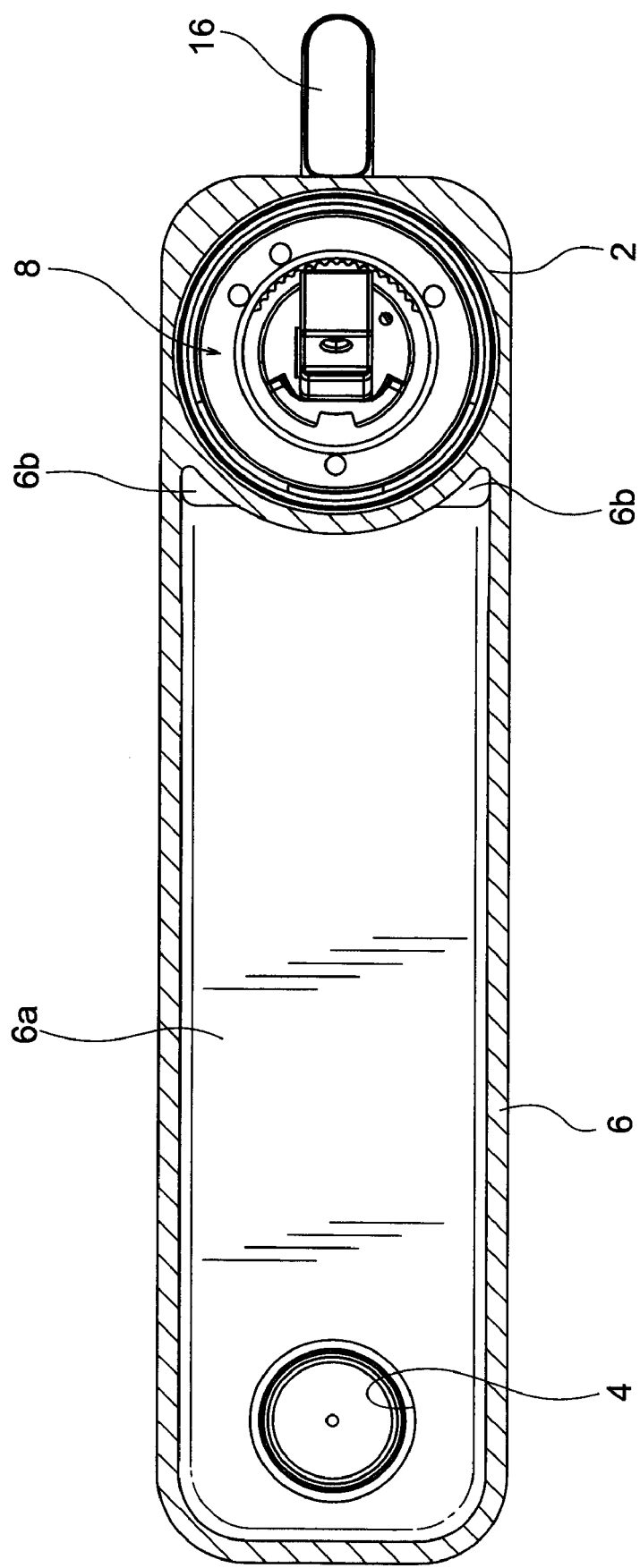
FIG. 8 is a top plan sectional view taken along the line viii-viii in FIG. 3.
Figure 9:
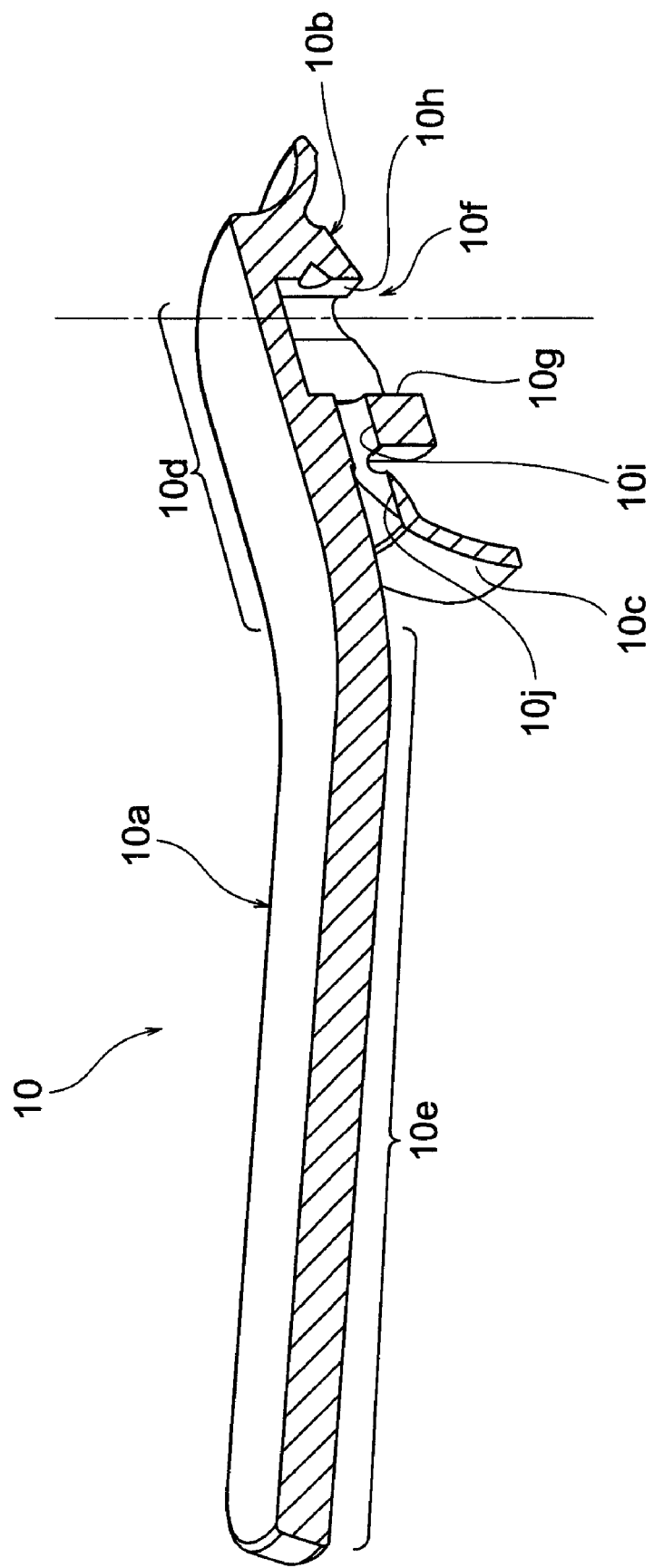
FIG. 9 is a sectional perspective view showing an operating lever.

FIG. 1 is a partially broken away side view generally showing the mixing faucet assembly according to the first embodiment. FIG. 2 is an exploded sectional perspective view showing the mixing faucet assembly according to the first embodiment. FIG. 3 is a sectional side view showing the mixing faucet assembly according to the first embodiment, in a water shutoff state, and FIG. 4 is a sectional perspective view showing the mixing faucet assembly according to the first embodiment, in a water discharge state. FIGS. 5 to 8 are top plan sectional views of a faucet body. FIG. 9 is a sectional perspective view showing an operating lever.

As shown in FIG. 1, the mixing faucet assembly 1 according to the first embodiment comprises a faucet body 2 extending in an approximately vertical direction, and a spout portion 6 which extends from an upper end of the faucet body 2 in an approximately horizontal direction and has a distal end provided with a spout port 4. The mixing faucet assembly 1 further includes a mixing valve unit 8 adapted to appropriately mix hot water and cold water together and adjust a discharge flow rate, and an operating lever 10 mounted on an upper portion of the faucet body 2 to allow a user to manually operate the mixing valve unit 8.

The mixing faucet assembly 1 according to the first embodiment is designed to allow the operating lever 10 to be rotated in a rightward/leftward direction, i.e., rotated about a vertical axis as a first axis, so as to change a mixing ratio between hot water and cold water supplied from a hot-water supply pipe 12 and a cold-water supply pipe 14, respectively. Further, the mixing faucet assembly 1 is designed to allow that the operating lever 10 to be rotated in a upward/downward direction, i.e., rotated about a horizontal axis as a second axis, so as to adjust a discharge flow rate of a mixture of hot and cold water and spout the mixture from the spout port 4 of the spout portion 6.

As shown in FIG. 2, the faucet body 2 is provided with a drain-valve lever 16 on the side of a back surface thereof, to manually open and close a drain valve (not shown) of a bawl of a wash stand (not shown). A user can manually operate a mechanism 16a for opening and closing the drain valve.

Further, as shown in FIG. 2, the mixing faucet assembly 1 includes an annular-shaped valve-holding member 18 for fixing the mixing valve unit 8, a slip ring 20 to be placed on the valve-holding member 18, and a cover ring 22 to be placed on the slip ring 20.

With reference to FIGS. 1 to 9, the structure of each of the above components will be specifically described.

Referring primarily to FIGS. 1 and 2, the faucet body 2 is formed in a generally square pole shape, and positioned to extend in an approximately vertical direction. The faucet body 2 has an upper end formed as a valve unit-receiving recess 2a for containing the mixing valve unit 8. The faucet body 2 has a lower end which is fluidically connected to the hot-water supply pipe 12 and the cold-water supply pipe 14, and two water-feed passages 2b (only a hot water-feed passage is illustrated in FIG. 2) are formed in the faucet body 2 to allow hot and cold water supplied from the hot-water and cold-water supply pipes 12, 14 to be led to the mixing valve unit 8 respectively therethrough.

Referring primarily to FIGS. 1 and 2, the spout portion 6 is integrally formed with the faucet body 2 and to extend from the upper end of the faucet body 2 in an approximately horizontal direction with a rectangular shape in section. The spout portion 6 is internally formed with a spout-portion water passage 6a which communicates with the valve unit-receiving recess 2a of the faucet body 2. The spout portion 6 is also formed to have a top surface which is flush with an upper end surface of the faucet body 2, i.e., in such a manner that the top surface the spout portion 6 and the upper end surface of the faucet body 2s are in one plane. Further, the spout port 4 is formed in a bottom surface of the distal end of the spout portion 6, and adapted to spout the mixture led through the spout-portion water passage 6a formed inside the spout portion 6. A flow-regulating cap 4a is attached to the spout port 4.

With reference to FIGS. 5 to 8, the configuration of a water passage formed in each of the faucet body 2 and the spout portion will be described below. FIGS. 5 to 8 are top plan sectional views taken along the line v-v, the line vi-vi, the line vii-vii and the line viii-viii in FIG. 3, respectively, wherein the mixing valve unit 8 contained in the faucet body 2 is not shown in section for simplifying illustration).

Figure 5:
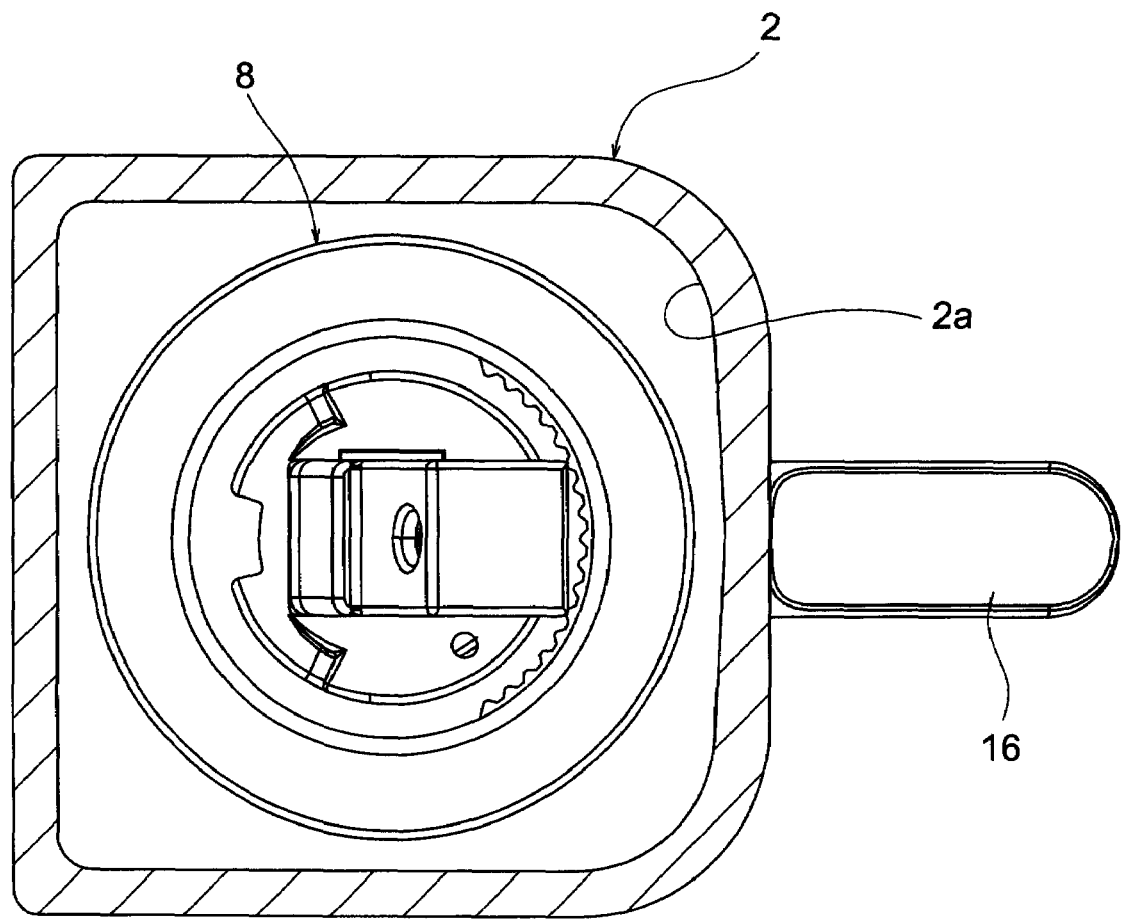
FIG. 5 is a top plan sectional view taken along the line v-v in FIG. 3.

As shown in FIG. 5, the valve unit-receiving recess 2a has a front surface or a first surface of the faucet body 2 formed with the spout portion 6, and two lateral surfaces or second and third surfaces extending from respective opposite edges of the front surface to form a generally angular-C shape in cooperation with the front surface. Further, each of the lateral surfaces is connected to a rear surface of the faucet body 2 by an arc-shaped surface having a relatively large radius in sectional. The mixture of hot and cold water mixed in the mixing valve unit 8 is discharged from a valve outlet port 28 (see FIGS. 3 and 4) into a space between the mixing valve unit 8 and the valve unit-receiving recess 2a.

Figure 6:
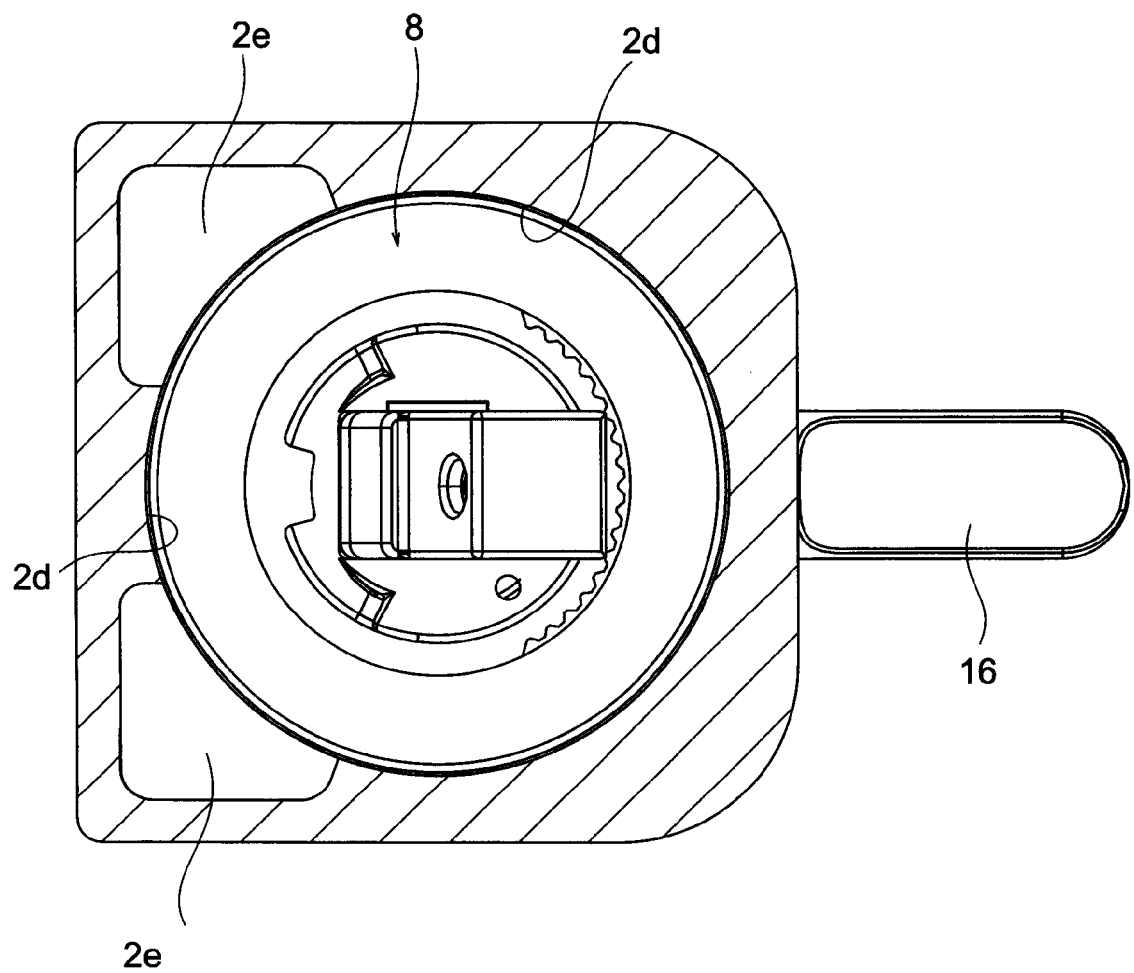
FIG. 6 is a top plan sectional view taken along the line vi-vi in FIG. 3.

As shown in FIG. 6, a load-supporting portion 2d (also illustrated in FIGS. 3 and 4) composed of an annular-shaped protrusion is formed in an approximately vertically intermediate region of the valve unit-receiving recess 2a. This load-supporting portion 2d is brought into contact with the lateral surface of the mixing valve unit 8 to restrict a lateral movement of the mixing valve unit 8. The mixture discharged from the mixing valve unit 8 flows upwardly through passages 2e formed by cutting out parts of the load-supporting portion 2d. These passages 2e are formed between the cylindrical lateral surface of the mixing valve unit 8 and each of two corners on the side of the front surface of the valve unit-receiving recess 2a to make a generally triangular-shaped passages.

Figure 7:
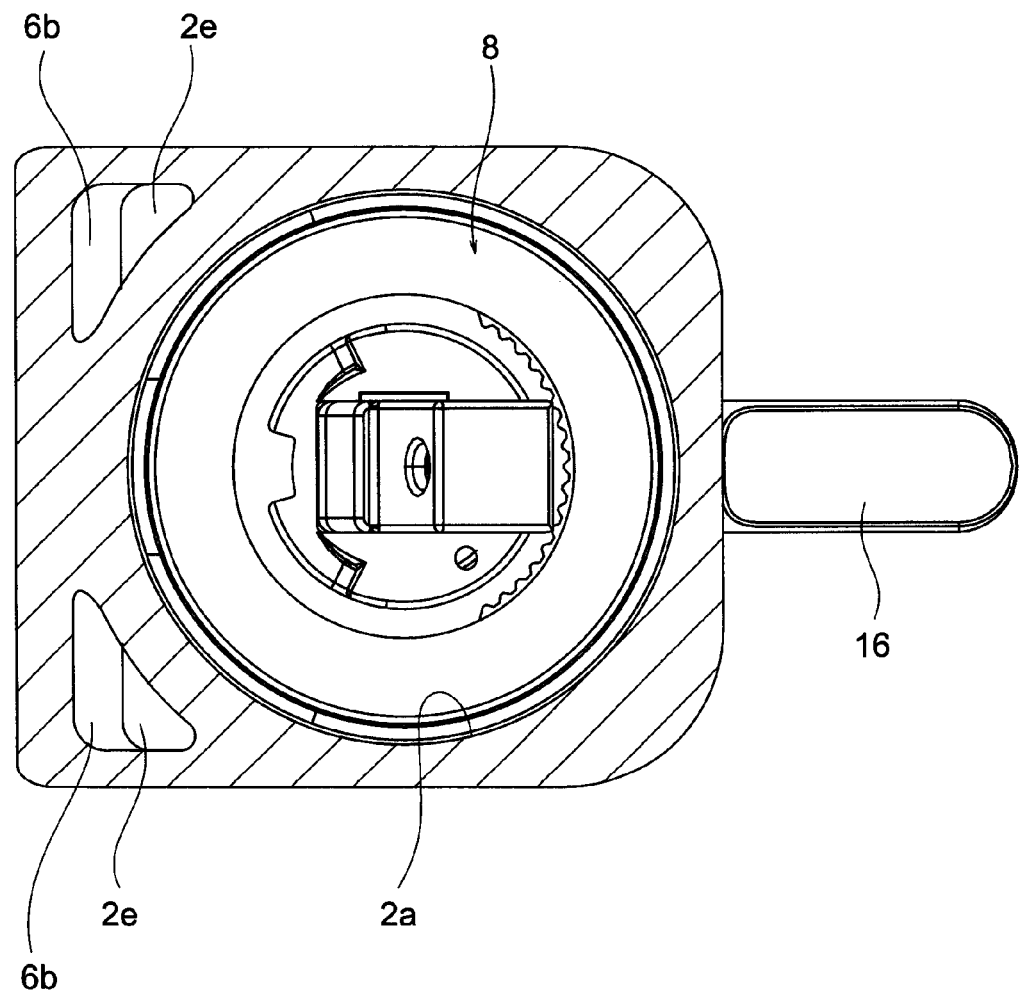
FIG. 7 is a top plan sectional view taken along the line vii-vii in FIG. 3.

As shown in FIG. 7, the valve unit-receiving recess 2a is formed to have a circular shape in a region thereof above the spout-portion water passage 6a. In a transient region from the faucet body 2 to the spout portion 6, the mixture which has flowed upwardly through the passages 2e in FIG. 6 further flows upward through two branched transient-region water passages 6b. Then as shown in FIG. 8, the mixture which has flowed upward through the transient-region water passages 6b is received in the spout-portion water passage 6a of the spout portion 6 and spouted from the spout port 4.

Referring primarily to FIG. 2, the valve-holding member 18 comprises an annular-shaped upper ring portion 18a having a relatively small diameter, and an annular-shaped lower ring portion 18b having a relatively large diameter. The lower ring portion 18b has an external thread formed in an outer peripheral surface of a lower end thereof, and this external thread is adapted to be engageable with an internal thread 2f formed in an inner wall surface of the valve unit-receiving recess 2a. After the mixing valve unit 8 is contained in the valve unit-receiving recess 2a, the external thread of the lower ring portion 18b is engaged with the internal thread of the valve unit-receiving recess 2a to fasten the mixing valve unit 8 to the valve unit-receiving recess 2a while pressing a shoulder 8a of the mixing valve unit 8 downwardly against the valve unit-receiving recess 2a. In a state after the fastening of the mixing valve unit 8, an upper portion of the mixing valve unit 8 is received in the upper ring portion 18a, and a operating rod 24 of the mixing valve unit 8 protrudes upward from the upper ring portion 18a. An O-ring 18c and an O-ring 8b are attached, respectively, onto an outer periphery of an upper region of the lower ring portion 18b, is attached onto an inner periphery of the shoulder 8a of the mixing valve unit 8 to ensure water-tightness of the valve unit-receiving recess 2a.

The slip ring 20 is an annular-shaped member having an outer peripheral portion bent upwardly, and placed on the lower ring portion 18b to surround the upper ring portion 18a of the valve-holding member 18. Further, the slip ring 20 also has another outer peripheral portion formed as a cantilevered positioning tongue portion 20a extending upwardly (see FIG. 2). This positioning tongue portion 20a is formed to protrude upwardly relative to the upwardly-bent portion of the slip ring 20. The positioning tongue portion 20a has an outer surface formed with a protrusion 20a (see FIG. 1). This protrusion 20b is inserted into a positioning depression 2c (see FIG. 2) formed in the inner peripheral surface of the valve unit-receiving recess 2a to fix a rotational position of the slip ring 20. The slip ring 20 is made of a resin material providing excellent surface smoothness to reduce a friction with a member to be in contact with the slip ring 20.

As shown in FIG. 9, the operating lever 10 has a plate-shaped grip portion 10a adapted to be gripped by a user, an attaching portion 10b adapted to be attached to the operating rod 24 of the mixing valve unit 8, and a semispherical-shaped skirt portion 10c formed around the attaching portion 10b. The grip portion 10a has a proximal end region 10d oriented in a horizontal direction, in a water shutoff state, and a distal end region 10e bent from the proximal end region and oriented in an obliquely upward direction in the water shutoff state. This distal end region 10e is bent such that an angle θ between a longitudinal axis X of the distal end region 10e and an axis of an upper half of the operating rod 24 is set at an acute angle of less than 90 degrees (see FIG. 3). Further, the distal end region 10e is bent at an angle which allows the longitudinal axis X to pass through a vicinity of a pivot shaft 24b of the operating rod 24 (see FIG. 3).

The attaching portion 10b is formed with a square pole-shaped depressed portion 10f adapted to allow the operating rod to be inserted therein. The depressed portion 10f has an inner wall including a pair of opposed surfaces which consist of a first opposed surface 10g and a second opposed surface 10h. The first opposed surface 10g is formed with a attaching-portion hole 10i which serves as a small hole for allowing a tool for driving a locking or retaining screw 26 screwed on an internal thread 24a (see FIG. 2) formed in the operating rod 24 to be inserted therethrough. Correspondingly, a front region of the skirt portion 10c is formed with a skirt-portion hole 10j which is a small hole aligned with the attaching-portion hole 10i, to allow the tool for driving the retaining screw 26 to be inserted therethrough from outside. The skirt-portion hole 10j formed as a small hole located below the grip portion can prevent deterioration in appearance and serve as a means to guide the tool for driving the retaining screw 26 during an insertion operation of the tool.

Referring primarily to FIGS. 3 to 9, configuration of the portion attaching the operating lever 10 to the operating rod 24 will be described below.

As shown in FIG. 3, the upper end of the operating rod 24 is inserted into the depressed portion 10f formed in the attaching portion 10b of the operating lever 10. In this state, the retaining screw 26 pre-screwed on the internal thread 24a of the operating rod 24 is aligned with the skirt-portion hole 10j formed in the skirt portion 10c and the attaching-portion hole 10i formed in the attaching portion 10b. Thus, a hexagonal wrench (not shown) can be inserted through the skirt-portion hole 10j and the attaching-portion hole 10i, and engaged with a hexagonal-shaped hole formed at one end of the retaining screw 26 is turned by the hexagonal wrench. Along with the turning operation, the retaining screw 26 protrudes from the a first lateral surface 24c of the operating rod 24, the other end of the retaining screw 26 is brought into contact with the second opposed surface 10h of the attaching portion 10b. When the retaining screw 26 is further driven, the other end of the retaining screw 26 is slightly bitten into the second opposed surface 10h of the attaching portion 10b, and the first opposed surface log on the opposite side of the second opposite surface 10h is pressed against a second lateral surface 24d of the operating rod 24.

As shown primarily in FIG. 2, the cover ring 22 is a ring member formed to have a flat surface. The cover ring 22 is adapted to be fitted in the upper end of the valve unit-receiving recess 2a, and positioned to surround the skirt portion 10c of the operating lever 10. The cover ring 22 has a lower peripheral portion formed with a single notch 22a for receiving therein the positioning tongue portion 20a of the slip ring 20. Thus, the cover ring 22 is fitted in the valve unit-receiving recess 2a in such a manner that the notch 22a can receive the positioning tongue portion 20a therein to fix the rotational position of the cover ring 22. In this manner, the cover ring 22 is positioned relative to the slip ring 20. Further, the slip ring 20 is positioned relative to the faucet body 2, as mentioned above. Thus, a rotational position of the cover ring 22 is positioned relative to the faucet body 2.

An O-ring 22b is fitted in the peripheral portion of the cover ring 22, and the cover ring 22 is fitted while flattening out the O-ring 22b. Thus, the cover ring 22 can be fitted in such a manner that it is hardly detached from the valve unit-receiving recess 2a. Further, the cover ring 22 is formed to have a tapered region 22c in an inner surface of the lower peripheral portion thereof. The skirt portion 10c of the operating lever 10 is slidingly moved relative to the tapered surface 22a, and thereby the movement of the operating lever 10 can be guided by the tapered surface 22a.

Referring primarily to FIGS. 3 and 4, the structure of the mixing valve unit 8 will be described below. The mixing valve unit 8 comprises the operating rod 24, a cover 30, and a stationary disc 32 and a movable disc 34 which are housed in the cover 30.

The operating rod 24 is designed to be rotated about the pivot shaft 24b oriented in a horizontal direction. This pivot shaft 24a is designed to be rotated about a vertical axis passing through a center of the mixing valve unit 8. Thus, the operating rod 24 is supported rotatably about both the pivot shaft 24b and the vertical axis The stationary disc 32 is a generally circular disc-shaped member formed with three through-holes 32a, 32b, and fixed to the cover 30. Two of the through-holes 32b (only one of the through-holes is illustrated) each serving as a valve inlet port are formed and arranged to communicate with the respective water-feed passages 2b (only one of the water-feed passages is illustrated), and the supplied hot and cold water are received in the two through-holes 32b, respectively.

The movable disc 34 is a generally circular disc-shaped member having a top surface formed with a rod-insertion depressed portion 34a and a bottom surface formed with a water-passage depressed portion 34b. A lower end of the operating rod 24 is inserted into the rod-insertion depressed portion 34a. When the operating rod 24 is rotated about the pivot shaft 24a, the movable disc 34 can be moved in a frontward/rearward direction relative to the stationary disc 32. When the operating rod 24 is rotated about the vertical axis, the movable disc 34 engaged with the operating rod 24 can also be rotated relative to the stationary disc 32.

The water-passage depressed portion 34b of the movable disc 34 is designed to appropriately open and close the two through-holes 32b of the stationary disc 32 when the movable disc 34 is moved relative to the stationary disc 32. Specifically, in the rearmost position of the movable disc 34 as shown in FIG. 3, the two through-holes 32b are fully closed by the movable disc 34 to provide the water shutoff state. When the operating rod 24 is rotated about the pivot axis to move the movable disc frontwardly from the above position, the two through-holes 32b will start overlapping the water-passage depressed portion 34. In this position, hot and cold water are passed through the through-holes 32b into the water-passage depressed portion 34b, and mixed together. Then, the mixture is discharged from the valve outlet port 28 to provide a water discharge state. In the frontmost position of the movable disc 34 as shown in FIG. 4, each of the through-holes 32b is set in a fully open state where a discharge flow rate is maximized.

When the operating rod 24 is rotated about the vertical axis to rotate the movable disc 34, an opening in each of through-holes 32b will be changed. Specifically, when the operating lever 10 (operating rod 24) is rotated in the direction H in FIG. 4, the opening of the through-hole 32b communicating with the hot-water supply pipe 12 is increased, and the opening of the other through-hole 32b communicating with the cold-water supply pipe 14 is reduced. That is, an inflow volume of cold water is reduced, and an inflow volume of hot water is increased. Thus, the mixture of hot and cold water to be discharged has a higher temperature. Conversely, when the operating lever (operating rod 24) is rotated in the direction C in FIG. 4, the inflow volume of cold water is increased, and the inflow volume of hot water is reduced. Thus, the higher temperature of the mixture to be discharged is lowered. Further, even if the operating rod 24 is rotated in the vertical direction when the movable disc 34 is in the rearmost position as illustrated in FIG. 3, each of the through-holes 32b is kept in a closed state, and thereby the water shutoff state is maintained.

An operation of the mixing faucet assembly 1 according to the first embodiment will be described below. In the water shutoff state as illustrated in FIG. 3, the movable disc 34 closes the two through-holes 32b formed in the stationary disc 32, and thereby hot and cold water supplied from the hot-water and cold-water supply pipes 12, 14 are not received in the mixing valve unit 8 to maintain the water shutout state. Then, when the operating lever 10 (operating rod 24) is rotated about the pivot shaft 24b, the movable disc 34 is moved frontwardly to open the through-holes 32b so as to provide the water discharge state. When the operating lever 10 is oriented directly in the frontward direction, each of the through-holes 32b has the same opening, and thereby hot and cold water are received in the mixing valve unit in approximately the same amount.

The hot and cold water received in the mixing valve unit 8 are mixed together, and discharged from the valve outlet port 28 formed in the lateral surface of the mixing valve unit 8. The mixture of hot and cold water discharged from the valve outlet port 28 is received in the valve unit-receiving recess 2a, and moved upwardly. The mixture moved upwardly through the valve unit-receiving recess 2a is further moved upwardly via the two passages 2e (see FIG. 6) between the lateral surface of the mixing valve unit 8 and the wall surface of the valve unit-receiving recess 2a, and received in the spout-portion water passage 6a via the transient water passages 6b (see FIG. 7). The mixture received in the spout-portion water passage 6a is spouted from the spout port 4.

When the operating lever 10 is rotated upwardly, a rear end of the skirt portion 10c is brought into contact with a top surface of the slip ring 20 to preclude the operating lever 10 from being rotated any further. In this moment, an operating force transferred to the spout-portion water passage 6a through the operating rod 24 is supported by the load-supporting portion 2d to prevent a displacement of the mixing valve unit 8 due to the operating force. Further, the distal end region 10e of the operation lever 10 is bent relative to the proximal region 10d to be at an acute angle with the axis of the upper half of the operating rod 24. Thus, the user's operating force applied to the distal end region 10e at a right angle becomes different from a direction of the first opposed surface 10g and the second lateral surface 24d, and a component of the operating force in a direction of pulling the operating lever 10 out of the operating rod 24 is lowered.

When the operation lever 10 is rotated in the rightward or leftward direction, a mixing ratio between hot and cold water to be received can be changed to adjust a temperature of the mixture of hot and cold water to be discharged. Further, the rear end of the skirt portion 10c is in contact with the slip ring 20, and thereby a frictional force therebetween has a relatively small value to facilitate a rightward/leftward rotational movement of the operating lever 10.

Conversely, when the operating lever 10 is rotated downwardly, the front end of the skirt portion 10c is brought into contact with the top surface of the slip ring 20 to provide the water shutoff state and to preclude the operating lever 10 from being rotated downwardly any further. In this moment, an operating force transferred to the spout-portion water passage 6a through the operating rod 24 is supported by the load-supporting portion 2d to prevent a displacement of the mixing valve unit 8 due to the operating force.

In the mixing faucet assembly according to the first embodiment, the spout portion is designed to extend from the upper end of the faucet body in an approximately horizontal direction. This makes it possible to reduce an overall height dimension of the mixing faucet assembly at a lower value.

Further, in the mixing faucet assembly according to the first embodiment, a mixture of hot and cold water can be passed through between the valve unit-receiving recess and the mixing valve unit and led to the spout portion, to allow the faucet body to be reduced in size.

In the mixing faucet assembly according to the first embodiment, an operating force transferred to the mixing valve unit can be supported by the load-supporting portion to prevent a displacement of the mixing valve unit due to the operating force. This makes it possible to prevent an excessive force from being applied to the cover of the mixing valve unit so as to allow the valve outlet port to be formed in the lateral surface of the mixing valve unit.

In the mixing faucet assembly according to the first embodiment, the lateral surface of the mixing valve unit is formed in a cylindrical shape, and the front region of the valve unit-receiving recess is formed in the angular-C shape. Thus, a mixture of hot and cold water can be led to the spout portion the approximately triangular passage defined between each corner of the angular-C shape surface and the cylindrical lateral surface of the mixing valve unit, to allow the faucet body to be reduced in size.

Figure 10:
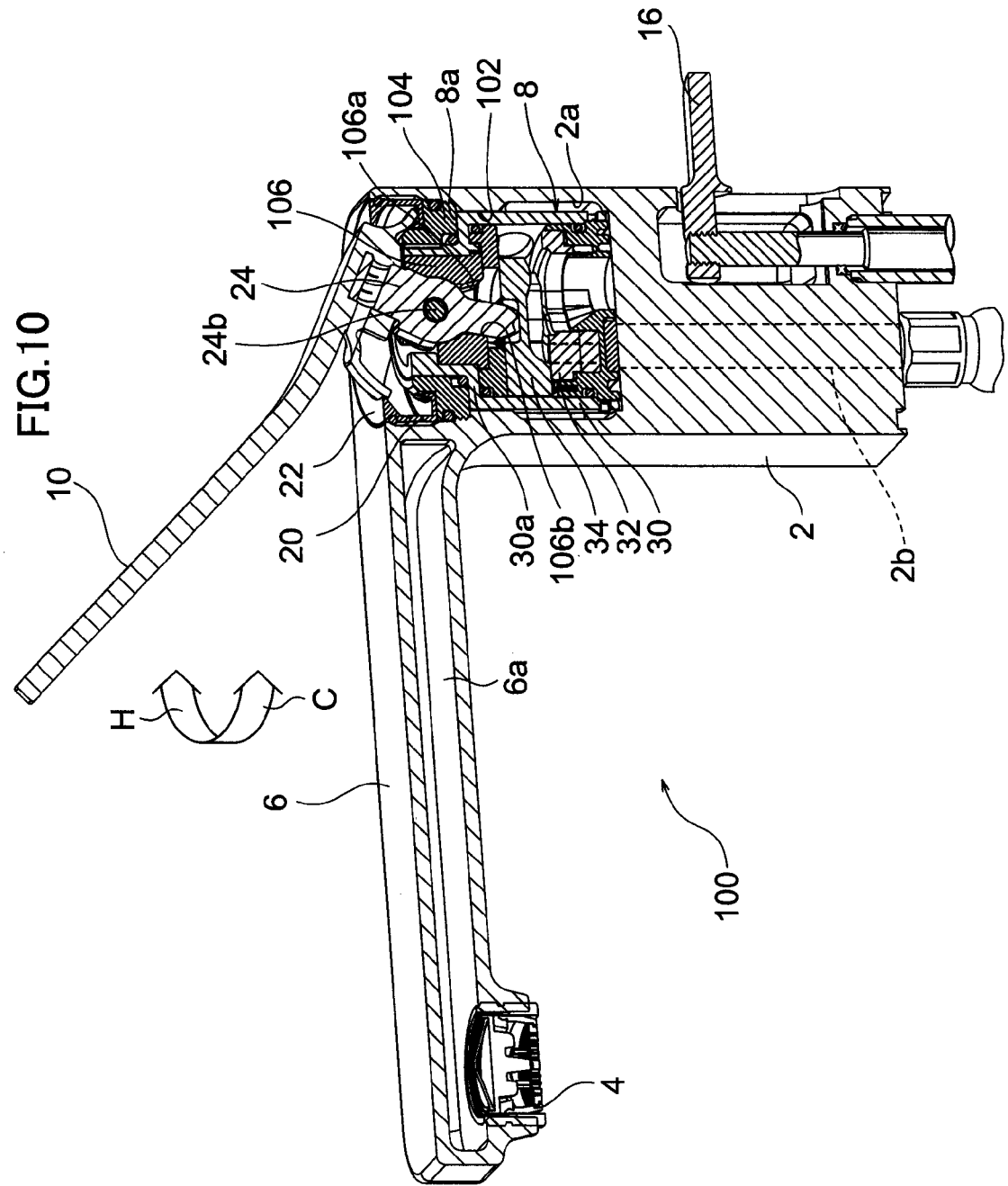
FIG. 10 is a partially broken away side view generally showing a mixing faucet assembly according to a second embodiment of the present invention.
Figure 11:
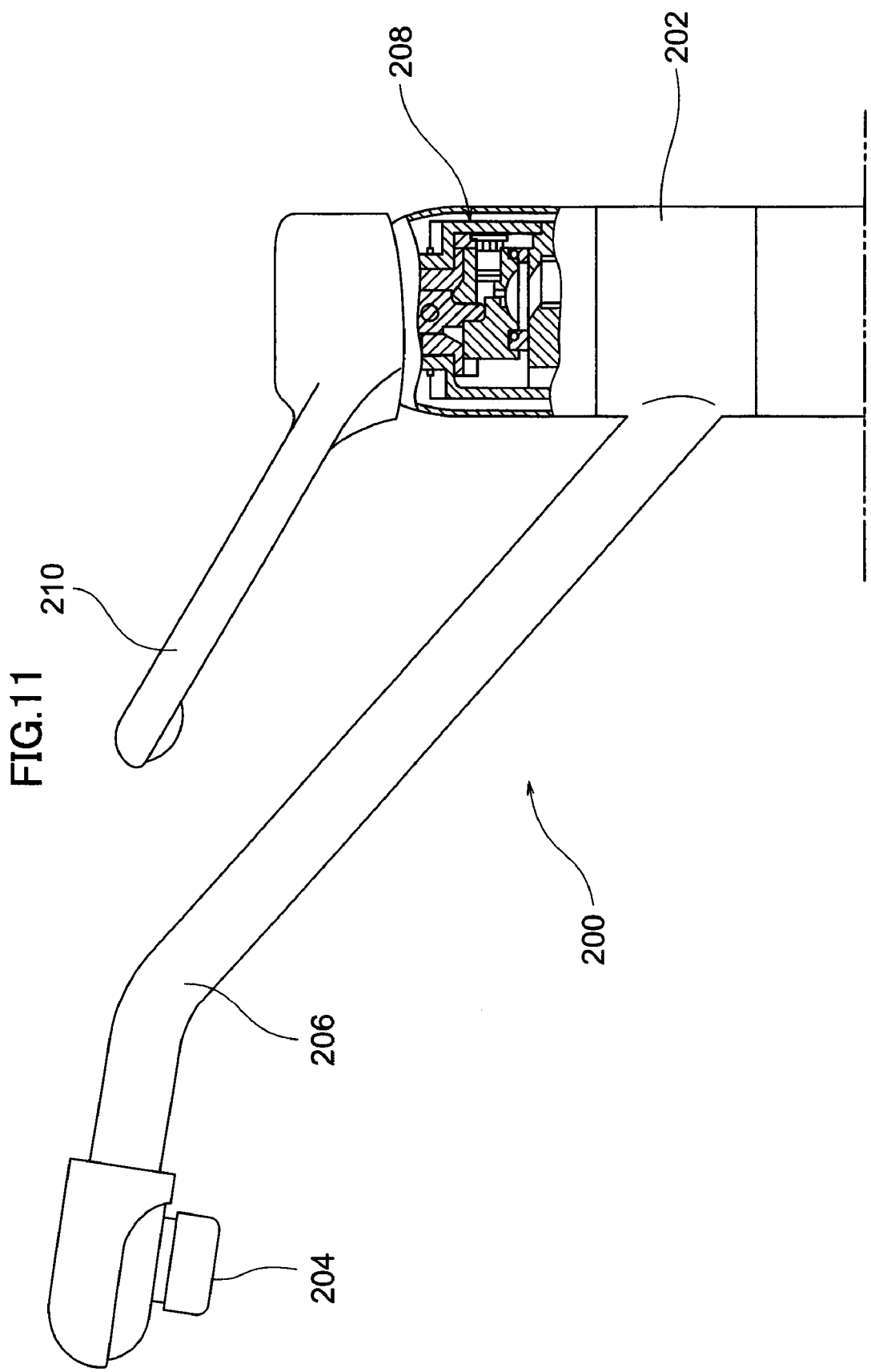
FIG. 11 is a partially broken away side view showing a conventional single-lever faucet.

With reference to FIG. 10, a mixing faucet assembly according to a second embodiment of the present invention will be described below. The mixing faucet assembly according to the second embodiment is different from the aforementioned first embodiment, in a configuration of the load-supporting portion formed in the valve unit-receiving recess. Thus, the following description will be made about only a difference between the first and second embodiments. In FIG. 10, structurally the same component or element as the first embodiment is defined by the same reference numeral or code, and its description will be omitted. FIG. 10 is a sectional perspective view showing the mixing faucet assembly according to the second embodiment.

As shown in FIG. 10, the mixing faucet assembly 100 according to the second embodiment comprises a faucet body 2, a spout portion 6 having a distal end provided with a spout port 4, a mixing valve unit 8, an operating lever 10, a drain valve lever 16, an annular-shaped valve-holding member 104, a slip ring 20 and a cover ring 22.

In the mixing faucet assembly 100 according to the second embodiment, a load-supporting portion 102 in a valve unit-receiving recess 2a of the faucet body 2 is formed at a higher position than that in the mixing faucet assembly according to the first embodiment. A shoulder 8a of the mixing valve unit 8 is pressed from above by the valve-holding member 104. Further, an upper end of the load-supporting portion 102 formed in the valve unit-receiving recess 2a is positioned to have a height approximately equal to that of the shoulder 8a of the mixing valve unit 8. Thus, the upper end of the load-supporting portion 102 is flush with an upper surface of a force-transferring surface portion 30a of the cover 30a which forms the shoulder 8a of the mixing valve unit 8. This force-transferring surface portion 30a is an annular-shaped flat surface portion extending in an approximately horizontal direction which constitutes a part of the cover 30, and the shoulder 8a is formed of the force-transferring surface portion 30a.

The mixing valve unit 8 includes a operating rod guide member 106 disposed on an upper side thereof to surround the operating rod 24, and a movement of the operating rod 23 is restricted by the operating rod guide member 106. Specifically, when the operating lever 10 is rotated downwardly to the lowermost position and then the operating rod 24 is rotated about a pivot shaft 24*b*, a rotational-movement restricting portion 106*a* on a rear side of the operating rod guide member 106 comes into contact with a lower portion of the operating rod 24 to exert an approximately horizontal force on the operating rod 24 so as to restrict the rotational movement of the operating rod 24. Conversely, when the operating lever 10 is rotated to the uppermost position, a rotational-movement restricting portion 106*b* on a front side of the operating rod guide member 106 comes into contact with the lower portion of the operating rod 24 to exert an approximately horizontal force on the operating rod 24 so as to restrict the rotational movement of the operating rod 24.

A reaction force to the approximately horizontal force exerted on the operating rod 24 by each of the rotational-movement restricting portions 106*a*, 106*b* is transferred to the load-supporting portion 102 through the force-transferring surface portion 30*a*, and supported by the load-supporting portion 102. In this process, the reaction force to the approximately horizontal force exerted on the operating rod 24 by each of the rotational-movement restricting portions 106*a*, 106*b* can be transferred directly to the load-supporting portion 102 through the force-transferring surface portion 30*a* extending in an approximately horizontal direction, without exerting an excessive force on the remaining portion of the cover 30. This makes it possible to prevent the mixing valve unit 8 from being deformed due to an operating force, without excessively increase the strength of the cover 30.

An advantageous embodiment of the present invention has been shown and described. It is obvious to those skilled in the art that various changes and modifications may be made therein without departing from the spirit and scope thereof as set forth in appended claims.

What is claimed is:

1. A mixing faucet assembly for changing a mixing ratio between hot and cold water supplied thereto and adjusting a discharge flow rate, using a single operating lever, comprising:

a mixing valve unit having valve inlet ports for receiving the supplied hot and cold water respectively therethrough, a operating rod for adjusting a mixing ratio between said received hot and cold water and a discharge flow rate, and a valve outlet port for discharging a mixture of hot and cold water therethrough, said mixing valve unit has a lateral surface formed in a cylindrical shape;

a faucet body having water-feed passages for leading the supplied hot and cold water, respectively, to said valve inlet ports and having a valve unit-receiving recess formed on an upper portion of said faucet body, said valve unit-receiving recess housing said mixing valve unit to receive the mixture discharged from said valve outlet port;

a spout portion extending from an upper end of said faucet body in an approximately horizontal direction and having a spout-portion water passage for receiving the mixture discharged from said valve unit-receiving recess and a spout port for spouting the mixture received in said spout-portion water passage; and a load-supporting portion inwardly protruding toward the inside of said valve unit-receiving recess and contacting with an upper region of a lateral surface of said mixing valve unit on at least one side corresponding to a location of said spout portion, to support said mixing valve unit;

wherein said valve unit-receiving recess has a first surface located on the side communicating with said spout portion, and second and third surfaces extending from respective opposed edges of said first surface to form a generally angular-C shape in cooperation with said first surface; and wherein the mixture discharged from said valve outlet port flows into said spout-portion water passage via generally triangular-shaped passages defined between two corners of said angular-C shaped surface and said cylindrical-shape lateral surface of said mixing valve unit.

2. A mixing faucet assembly for changing a mixing ratio between hot and cold water supplied thereto and adjusting a discharge flow rate, using a single operating lever, comprising:

a mixing valve unit having valve inlet ports for receiving the supplied hot and cold water respectively therethrough, a operating rod for adjusting a mixing ratio between said received hot and cold water and a discharge flow rate, and a valve outlet port for discharging a mixture of hot and cold water therethrough, said mixing valve unit has a lateral surface formed in a cylindrical shape;

a faucet body having water-feed passages for leading the supplied hot and cold water, respectively, to said valve inlet ports and having a valve unit-receiving recess formed on an upper portion of said faucet body, said valve unit-receiving recess housing said mixing valve unit to receive the mixture discharged from said valve outlet port;

a spout portion extending from an upper end of said faucet body in an approximately horizontal direction and having a spout-portion water passage for receiving the mixture discharged from said valve unit-receiving recess and a spout port for spouting the mixture received in said spout-portion water passage; and a load-supporting portion inwardly protruding toward the inside of said valve unit-receiving recess and contacting with an upper region of a lateral surface of said mixing valve unit on at least one side corresponding to a location of said spout portion, to support said mixing valve unit;

wherein said valve outlet port is formed in the lateral surface of said mixing valve unit, wherein the mixture discharged from said valve outlet port flows upwardly along the lateral surface of said mixing valve unit and then flows into said spout portion;

wherein said valve unit-receiving recess has a first surface located on the side communicating with said spout portion, and second and third surfaces extending from respective opposed edges of said first surface to form a generally angular-C shape in cooperation with said first surface, and wherein the mixture discharged from said valve outlet port flows into said spout-portion water passage via generally triangular-shaped passages defined between two corners of said angular-C shaped surface and said cylindrical-shape lateral surface of said mixing valve unit.

3. A mixing faucet assembly for changing a mixing ratio between hot and cold water supplied thereto and adjusting a discharge flow rate, using a single operating lever, comprising:

a mixing valve unit having valve inlet ports for receiving the supplied hot and cold water respectively therethrough, a operating rod for adjusting a mixing ratio between said received hot and cold water and a discharge flow rate, and a valve outlet port for discharging a mixture of hot and cold water therethrough said mixing valve unit has a lateral surface formed in a cylindrical shape;

a faucet body having water-feed passages for leading the supplied hot and cold water, respectively, to said valve inlet ports and having a valve unit-receiving recess formed on an upper portion of said faucet body, said valve unit-receiving recess housing said mixing valve unit to receive the mixture discharged from said valve outlet port;

a spout portion extending from an upper end of said faucet body in an approximately horizontal direction and having a spout-portion water passage for receiving the mixture discharged from said valve unit-receiving recess and a spout port for spouting the mixture received in said spout-portion water passage; and a load-supporting portion inwardly protruding toward the inside of said valve unit-receiving recess and contacting with an upper region of a lateral surface of said mixing valve unit on at least one side corresponding to a location of said spout portion, to support said mixing valve unit;

wherein said mixing valve unit includes a rotational-movement restricting portion adapted to exert an approximately horizontal force on said operating rod so as to restrict a rotational movement of said operating rod, and a force-transferring surface portion extending in approximately horizontal direction to transfer a force imposed on said rotational-movement restricting portion, and said load-supporting portion is disposed on a plane including said force-transferring surface portion or in a vicinity of said force-transferring surface portion:

wherein said valve unit-receiving recess has a first surface located on the side communicating with said spout portion, and second and third surfaces extending from respective opposed edges of said first surface to form a generally angular-C shape in cooperation with said first surface; and wherein the mixture discharged from said valve outlet port flows into said spout-portion water passage via generally triangular-shaped passages defined between two corners of said angular-C shaped surface and said cylindrical-shape lateral surface of said mixing valve unit.

4. A mixing faucet assembly for changing a mixing ratio between hot and cold water supplied thereto and adjusting a discharge flow rate, using a single operating lever, comprising:

a mixing valve unit having valve inlet ports for receiving the supplied hot and cold water respectively therethrough, a operating rod for adjusting a mixing ratio between said received hot and cold water and a discharge flow rate, and a valve outlet port for discharging a mixture of hot and cold water therethrough: said mixing valve unit has a lateral surface formed in a cylindrical shape:

a faucet body having water-feed passages for leading the supplied hot and cold water, respectively, to said valve inlet ports and having a valve unit-receiving recess formed on an upper portion of said faucet body, said valve unit-receiving recess housing said mixing valve unit to receive the mixture discharged from said valve outlet port:

a spout portion extending from an upper end of said faucet body in an approximately horizontal direction and having a spout-portion water passage for receiving the mixture discharged from said valve unit-receiving recess and a spout port for spouting the mixture received in said spout-portion water passage: and a load-supporting portion inwardly protruding toward the inside of said valve unit-receiving recess and contacting with an upper region of a lateral surface of said mixing valve unit on at least one side corresponding to a location of said spout portion, to support said mixing valve unit;

wherein said valve outlet port is formed in the lateral surface of said mixing valve unit, wherein the mixture discharged from said valve outlet port flows upwardly along the lateral surface of said mixing valve unit and then flows into said spout portion:

wherein said mixing valve unit includes a rotational-movement restricting portion adapted to exert an approximately horizontal force on said operating rod so as to restrict a rotational movement of said operating rod, and a force-transferring surface portion extending in approximately horizontal direction to transfer a force imposed on said rotational-movement restricting portion:

wherein said load-supporting portion is disposed on a plane including said force-transferring surface portion or in a vicinity of said force-transferring surface portion:

wherein said valve unit-receiving recess has a first surface located on the side communicating with said spout portion, and second and third surfaces extending from respective opposed edges of said first surface to form a generally angular-C shape in cooperation with said first surface; and wherein the mixture discharged from said valve outlet port flows into said spout-portion water passage via generally triangular-shaped passages defined between two corners of said angular-C shaped surface and said cylindrical-shape lateral surface of said mixing valve unit.

* * * * *